United States Patent [19]
Kang

[11] Patent Number: 5,263,013
[45] Date of Patent: Nov. 16, 1993

[54] APPARATUS FOR RECORDING/REPRODUCING OF A DOUBLE-SIDED OPTIC DISK

[75] Inventor: Sin-won Kang, Busan, Rep. of Korea
[73] Assignee: SamSung Electronics Co., Ltd., Paldal, Rep. of Korea
[21] Appl. No.: 883,384
[22] Filed: May 15, 1992
[30] Foreign Application Priority Data
Dec. 24, 1991 [KR] Rep. of Korea ............ 91-24196
[51] Int. Cl.⁵ .................................. G11B 7/00
[52] U.S. Cl. .......................... 369/112; 369/199; 369/44.14
[58] Field of Search ............. 369/195, 199, 200, 224, 369/44.14, 44.22, 111, 112, 13, 77.01, 44.23, 44.24, 44.37, 93, 94, 44.21, 106, 34; 360/114

[56] References Cited
U.S. PATENT DOCUMENTS
4,058,834 11/1977 Miyaoka .................. 369/111
4,926,403 5/1990 Tsuyuguchi et al. ...... 369/199 X
4,953,154 8/1990 Takahara et al. ......... 369/195

Primary Examiner—Aristotelis Psitos
Assistant Examiner—Thang V. Tran
Attorney, Agent, or Firm—Robert E. Bushnell

[57] ABSTRACT

An apparatus for recording/reproducing of a double-sided optic disk includes a main pickup which supplies a light beam and detects a reflected light beam for recording/reproducing from one side of an optic disk. After completing the recording/reproducing of one side, the main pickup moves outside a periphery of the optic disk for recording/reproducing another side. The apparatus includes a mirror member which reflects the light beam supplied from the main pickup positioned outside the periphery to the other side of the optic disk, and an auxiliary pickup which focuses and scans the light beam on the other side via the mirror member. The light beam reflected from the other side of the optic disk is detected by the main pickup.

24 Claims, 2 Drawing Sheets

APPARATUS FOR RECORDING/REPRODUCING OF A DOUBLE-SIDED OPTIC DISK

BACKGROUND OF THE INVENTION

The present invention relates to an apparatus for recording/reproducing of a double-sided optic disk, and more particularly to an apparatus for recording and/or reproducing of a double-sided optic disk wherein information is recorded on and/or reproduced from both sides of an optic disk without transferring an optic pickup from one side to the other side.

Generally, in an apparatus which optically records and reproduces information via an optic disk medium, an optic disk is rotated by a spindle motor at a constant angular velocity or constant linear velocity, and an optic pickup radiates a laser beam while moving along a radius of the rotating optic disk by a transferring device such as a voice coil motor. Here, the laser beam is modulated in accordance with the desired data during the recording of information, and the modulated and reflected beam from the optic disk is detected as an electrical signal during reproducing.

When the optic disk for a general recording/reproducing apparatus is capable of double-sided recording and/or reproducing, after completing the recording and/or reproducing of one side, the disk must be reversed to record/reproduce the other side. However, the reversing of the optic disk is a troublesome and time-consuming chore, which makes the recording and reproducing inconvenient. To successively record and/or reproduce the optic disk without reversing it, an optic pickup may be respectively installed on both sides of the optic disk, which is also unfavorable since this involves excessive cost.

Japanese Laid Open Patent Publication Nos. sho 63-298766, sho 63-302479, Hei 2-21469, Hei 2-287965, and others, describe apparatuses wherein the optic disk is neither reversed, nor is an additional optic pickup installed, to carry out successive recording/reproducing. These apparatuses commonly have a U-shaped guide apparatus for transferring the optic pickup from one side to the other. Also, a rack gear is formed on the U-shaped guide apparatus, and a pinion connected to the rack gear is installed in the pickup. The pinion is driven by a motor mounted together with the pickup. Accordingly, when the pinion is rotated on the rack gear, the entire pickup moves along the U-shaped guide apparatus.

The above structure for transferring the optic pickup from one side to the other side of the optic disk can solve the burdensome cost problem of installing an additional optic pickup. However, the above apparatuses have design and manufacturing problems. After reproducing one side of the optic disk, since the transferring of the optic pickup to reproduce the other side requires a slight amount of time, instantaneous successive reproducing is impossible. Also, since the optic pickup is moved outside the periphery of the optic disk and around to the other side, the surrounding space must be set aside for this operation, which makes miniaturization difficult. Moreover, the accuracy of precisely positioning the optic pickup on both sides of the optic disk, and the mechanical stability requirement for in hanging the optic pickup upside down, present further problems in the design and manufacture of the product.

SUMMARY OF THE INVENTION

The present invention is devised to solve the above-described and associated problems. Accordingly, it is an object of the present invention to provide an apparatus for the recording/reproducing of a double-sided optic disk, wherein only one optic pickup is used, but the other side of an optic disk also can be instantaneously reproduced (or recorded) after the reproducing (or recording) of one side of the optic disk, without rotational transferring of the optic pickup from one side to the other of the optic disk.

To achieve the above and other objects of the present invention, an apparatus for recording/reproducing of a double-sided optic disk having information on both sides thereof includes:

main pickup means installed so as to be capable of being transferred along a radius of one side of the optic disk, and radiating a light beam on the one side of the optic disk;

a mirror member external to a periphery of the optic disk, for reflecting the light beam from the main pickup means in parallel with a other side of the optic disk and toward a center of the optic disk; and auxiliary pickup means installed to be slid along an optic path, formed from the mirror member, to the center of the optic disk, for focusing and scanning the light beam an the optic path on the other side of the optic disk with a reflection mirror and a focusing lens, wherein the reflected beams from the one side an the other side of the optic disk are sensed by the main pickup means.

BRIEF DESCRIPTION OF THE DRAWINGS

Other objects and advantages of the present invention will become more apparent by the following description with reference to the accompanying drawings, in which.

DETAILED DESCRIPTION OF A PREFERRED EMBODIMENT

Figure 1:
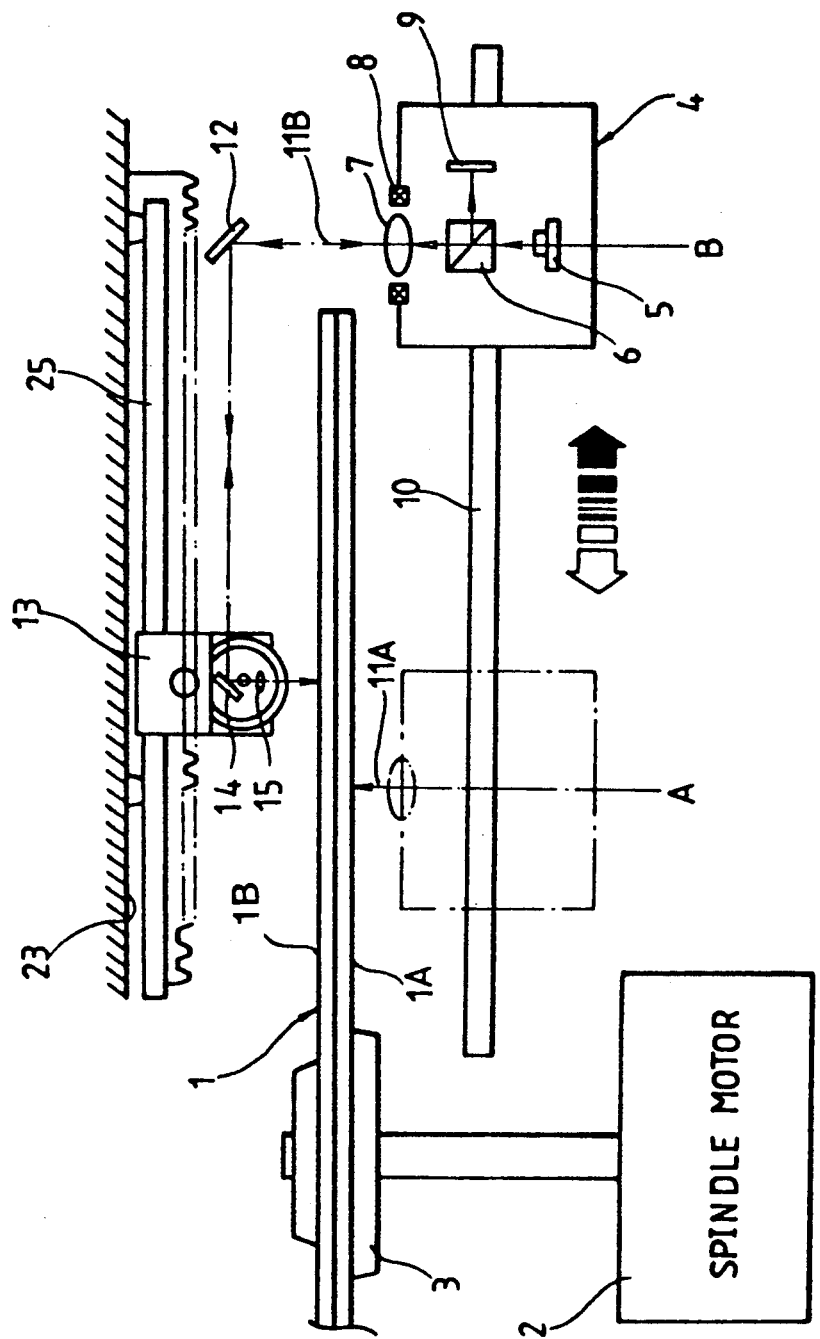
FIG. 1 is a side view of an apparatus for recording/reproducing of a double-sided optic disk according to the present invention.

Referring to FIG. 1, an optic disk 1 is seated on a turntable 3 which is rotated by a general spindle motor 2. A main pickup 4 is installed below optic disk 1. For the convenience of description, main pickup 4 of FIG. 1 includes: a light source 5 for radiating an light beam; a beam splitter 6 which transmits the light beam from the light source 5 to the optic disk 1 and reflects the light beam reflected from the optic disk 1 at a right angle; an objective lens 7 for focusing the light beam, and a focussing actuator coil 8; and a light detector 9 for detecting an electrical reproducing signal, control signal, etc., from the reflected light beam. Also, in order to radiate the light beam on individual target tracks of optic disk 1, main pickup 4 supported by a transferring guide rod 10 can be moved along the radius of optic disk 1 by an unshown transferring motor, e.g., a voice coil motor. As illustrated in FIG. 1, main pickup 4 moves along a section from an inner point A of optic disk 1 to an outer point B. That is, a light beam 11A radiated from main pickup 4 is incident to one side (1B) of optic disk 1 at all points except point B, and at point B, a light beam 11B travels past optic disk 1. A mirror member 12 of the present invention reflects light beam 11B which passes to the other side 1B of optic disk 1, beyond perimeter of the optic disk 1 and travelling parallel to and toward a center of optic disk 1.

Figure 2:
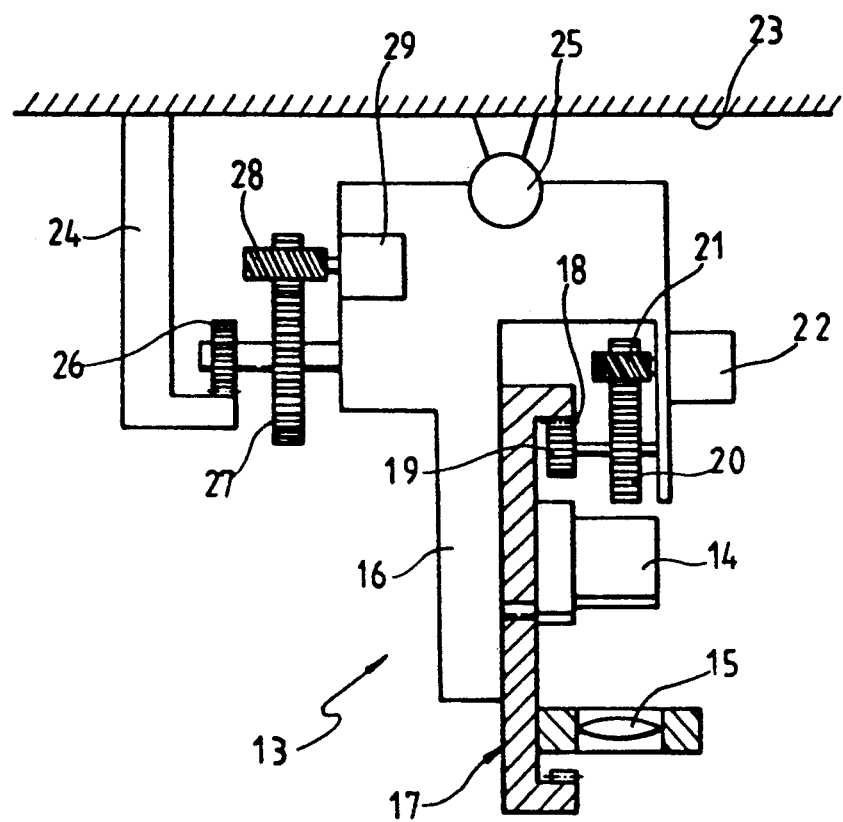
FIG. 2 is a detailed side view showing an auxiliary pickup and its transfer in the apparatus for recording/reproducing of a double-sided optic disk according to the present invention.
Figure 3:
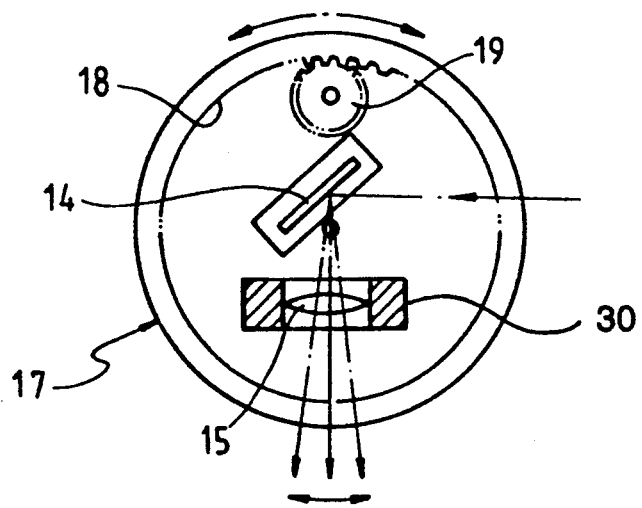
FIG. 3 is a front view illustrating the operation of the auxiliary pickup shown in FIG. 2.

An auxiliary pickup 13 which focuses and scans light beam 11B reflected to side 1B of optic disk 1 by mirror member 12 includes a reflection mirror 14 for reflecting light beam 11B by 90 degrees, and a focusing lens 15 for focusing light beam 11B. In addition, as shown in FIGS. 2 and 3, a holder 16 and a ring gear 18 are formed on auxiliary pickup 13 which also has a rotating member 17 supported by holder 16 and equipped with reflection mirror 14 and focusing lens 15. A tilting gear 19 is engaged with ring gear 18 of rotating member 17, and a tilting motor 22 for driving gears such as tilting gear 19 engaged with ring gear 18 of rotating member 17, a coupling gear 20 and a worm 21. Here, rotating member 17 and tilting motor 22 serve as actuator coil 8 of objective lens 7 which perform tracking/focusing servo operations of a general optic pickup which includes main pickup 4, and accurately control the position of the light beam which is incident to side 1B of optic disk 1 via reflection mirror 14 and focusing lens 15. This operation is described below.

In FIG. 2, a rack gear member 24 installed on a bracket 23, a feed guide rod 25 which passes through holder 16, a pinion 26 mounted on holder 16, a coupling gear 27, a worm 28, and a feed motor 29 are provided to radiate light beam 11B on a target track of side 1B of optic disk 1 by transferring auxiliary pickup 13.

In one embodiment of the present invention constructed as the above, when main pickup 4 is placed beneath optic disk 1 (at some point other than point B), side 1A of optic disk 1 can be recorded and/or reproduced, and when it is set at point B, side 1B of optic disk 1 can be recorded and/or reproduced. In the present invention, since a recorded portion of an optic disk begins from the point corresponding to point A of FIG. 1, after side 1A of optic disk 1 is recorded and/or reproduced, side 1B can be consecutively recorded and/or recorded at point B.

The recording/reproducing of side 1A of optic disk 1 is carried out in accordance with a common method, and thus the detailed description thereof will be omitted. Hereinafter, the recording/reproducing of side 1B will be described. At this time, main pickup 4 is set at the outer point B of optic disk 1 as shown in FIG. 1. After having radiated from light source 5 of main pickup 4 and sequentially passing through beam splitter 6 and objective lens 7, light beam 11B travels past the perimeter of optic disk 1 without striking it, and then is reflected by mirror member 12. Thereafter, the reflected light beam scans side 1B of optic disk 1. The beam reflected from side 1B proceeds back to main pickup 4 by way of focusing lens 15, reflection mirror 14, and mirror member 12, sequentially. As in the ordinary manner, the reflected beam heading back toward main pickup 4 passes through objective lens 7 and is reflected by beam splitter 6, so that light detector 9 detects the light beam. At this time, if feed motor 29 mounted on auxiliary pickup 13 is operated, pinion 26 is rotated through worm 28 and coupling gear 27, thereby moving along rack gear member 24 installed on bracket 23. Then, holder 16 of auxiliary pickup 13 moves along feed guide rod 25, moving the position of the beam scanning side 1B of optic disk 1. Accordingly, the beam can scan the target track of side 1B by controlling feed motor 29.

As tilting motor 22 mounted on holder 16 of auxiliary pickup 13 is operated, tilting gear 19 is rotated by means of worm 21 and coupling gear 20, which in turn rotates ring gear member 17. By this operation, as shown in FIG. 3, the angles of reflection mirror 14 and focusing lens 15 installed on ring gear member 17 are changed, which at the same time, changes the scanning position of the beam traveling through them. That is, the track error can be corrected by slightly rotating ring gear member 17 in the clockwise or counter-clockwise direction in accordance with the track error of the beam scanning side 1B of optic disk 1. The signal of the track error can be detected by a light detector which is provided in main pickup 4, as in a general method.

On the other hand, with respect to a focusing error caused by the vertical vibration of a focussing optical disk, an actuator coil 30 can vertically displace focusing lens 15. This correction can also be carried out by a light detector provided on main pickup 4.

In the present invention as described above, the recording/reproducing is performed using a main pickup which records on and/or reproduces from one side of an optic disk by supplying an incident beam of the optic disk and detecting the beam reflected from the main pickup, and a simple auxiliary pickup which records on and/or reproduces from the other side of the optic disk using the same incident beam supplied from the main pickup. Therefore, a much simpler and smaller apparatus than the conventional which transfers the optic pickup between sides, can be provided. The present invention is especially effective in that, after recording/reproducing one side of the optic disk, the subsequent recording/reproducing of the other side of the optic disk can be carried out instantaneously.

It will be apparent that many modifications and variations could be easily effected without departing from the spirit or scope of the novel concepts of the present invention.

What is claimed is:

1. An apparatus for recording/reproducing of a double-sided optic disk, said apparatus comprising:

main pickup means for radiating a light beam onto one side of said optic disk while moving along a first path parallel to a radius of said optic disk, and for radiating said light beam external to a periphery of said optic disk while remaining stationary beyond the periphery;

a mirror member positioned beyond the periphery of said optic disk, for reflecting said light beam radiated external to the periphery on a second path along an other side of said optic disk and parallel to the radius of said optic disk when the main pickup means is stationary and external to the periphery of said optic disk;

auxiliary pickup means, comprising a reflection mirror and a focussing lens, for moving along the second path when the main pickup means is stationary and external to the periphery, and for directing said reflected light beam with said reflection mirror so that said light beam passes through said focussing lens and onto the other side of said optic disk; and said main pickup means sensing light beams reflected from said optic disk.

2. The apparatus as claimed in claim 1, wherein:
said apparatus further comprises:
- a feed guide rod positioned parallel to said second path;
- a rack gear member positioned parallel to said second path; and auxiliary pickup means further comprises:
  - a feed motor;
  - a pinion engaging said rack gear member and driven by said motor;
- and auxiliary pickup means being supported by said feed guide rod supporting said auxiliary pickup means and moved along said second path by rotation of said pinion engaged with said rack gear member.

3. The apparatus as claimed in claim 2, further comprising:
- a separate bracket member with said rack gear member installed on said separate bracket member;
- said pinion and said feed motor being mounted on said auxiliary pickup means.

4. The apparatus as claimed in claim 2, wherein said auxiliary pickup means further comprises a feed motor and a gear assembly, said apparatus further comprising:
- a feed guide rod supporting the auxiliary pickup means and positioned parallel to said second path; and
- a rack gear positioned parallel to said second path;
- a gear assembly being connected between said feed motor and said rack gear for moving said auxiliary pickup along said feed guide rod when said gear assembly is driven by said feed motory.

5. The apparatus as claimed in claim 1, wherein said auxiliary pickup means further comprises tracking actuator means for adjusting an angle of the reflection mirror in accordance with a track error signal.

6. The apparatus as claimed in claim 1, wherein said auxiliary pickup means further comprises focussing actuator means for adjusting a vertical position of said focussing lens in response to a focusing error signal.

7. The apparatus as claimed in claim 5, wherein said tracking actuator means comprises: a rotating member having a gear portion and supporting said reflection mirror;
- a gear element connected to said gear portion; and
- a tilting motor for driving said gear element in accordance with said track error signal.

8. The apparatus as claimed in claim 6, wherein said focussing actuator means comprises: a coil element having said focussing lens loaded on said coil element, said coil element being operated in accordance with said focus error signal.

9. An apparatus for recording/reproducing a first side and a second side of a double-sided optic disk, said apparatus comprising:
- means for radiating a light beam for one of recording and reproducing of one of the first side and the second side of the optic disk;
- means for directing said light beam onto the first side of the optic disk by moving said radiating means along a first path parallel to a radius of the optic disk, said first path extending beyond a perimeter of the optic disk; and
- means, comprising a first mirror and an auxiliary pickup comprising a second mirror, for directing said light beam onto the second side of the optic disk when said radiating means is stationary and extending beyond the perimeter;
- said first mirror reflecting said light beam from said radiating means and said second mirror rejecting said light beam from said first mirror to the second side of the optic disk while said auxiliary pickup moves along a second path parallel to the radius of the optic disk.

10. The apparatus of claim 9, wherein said means for directing said light beam onto the second side of the optic disk further comprises:
- means for guiding said auxiliary pickup along the second path by slidingly supporting said auxiliary pickup; and
- rack and pinion means for moving said auxiliary pickup supported by said guiding means along the second path.

11. The apparatus of claim 9, wherein said auxiliary pickup is stationary while said apparatus is one of recording and reproducing on the first side of the optic disk.

12. The apparatus of claim 10, wherein said rack and pinion means comprises:
- a rack fixedly mounted on a bracket; and
- a feed motor;
- a gear assembly driven by said feed motor;
- a pinion connected to said gear assembly, said auxiliary pickup comprising the feed motor.

13. The apparatus of claim 9, wherein said auxiliary pickup further comprises a tracking adjustment means, comprising a rotating member, for adjusting a path of said light beam directed onto the second side of the optic disk in response to a tracking error signal by rotating the rotating member, said second mirror being fixedly connected to the rotating member.

14. The apparatus of claim 9, wherein said auxiliary pickup further comprises:
- means for focussing the light beam from the first mirror onto the second side of the optic disk; and
- focussing adjustment means, comprising an actuator coupled to said focussing means, for focussing the light beam from the first mirror onto the second side of the optic disk by said actuator displacing said focussing means in response to a focus error signal.

15. A method of recording/reproducing a first and a second side of a double-sided optic disk, comprising the steps of:
- radiating a light beam from a light source onto the first side of the optic disk while moving said light source along a first path parallel to a radius of the optic disk, said first path extending beyond a perimeter of the optic disk;
- radiating the light beam to a first mirror when the light source is stationary and extending beyond the perimeter;
- reflecting the light beam from the first mirror to a second mirror; and
- reflecting the light beam from the second mirror to the second side of the optic disk while moving the second mirror along a second path parallel to the radius of the optic disk.

16. The method of claim 15, wherein said second mirror is stationary during the step of radiating a light beam from a light source onto the first side of the optic disk.

17. The method of claim 15, further comprising the step of adjusting a tracking direction of the light beam reflected from the second mirror to the second side of the optic disk in response to a tracking error signal by rotating the second mirror.

18. The method of claim 15, further comprising the step of focussing the light beam from the second mirror onto the second side of the optic disk by moving a focussing lens positioned between the second mirror and the second side of the optic disk in response to a focus error signal.

19. An apparatus for reproducing information from a first side and a second side of an optical disk, said apparatus comprising:
   pickup means located on a first side of the optical disk and disposed to move parallel to said first side, for radiating a light beam parallel to an axis of rotation of the optical disk, said light beam being radiated onto the optical disk when said pickup means is within a periphery of the optical disk;
   reflection means for reflecting said light beam received from said pickup means parallel to and along said second surface of the optical disk when said pickup means is outside said periphery of the optical disk; and
   auxiliary pickup means located on said second side of the optical disk, for receiving said reflected light beam from said reflection means, and for directing said reflected light beam onto said second surface of the optical disk.

20. The apparatus as claimed in claim 19, further comprising:
   a feed guide rod for supporting said auxiliary pickup means; and
   said auxiliary pickup means being disposed to move parallel to said second side of the optical disk.

21. The apparatus as claimed in claim 19, wherein said auxiliary pickup means further comprises:
   tracking means for adjusting an angle that said reflected light beam is directed onto said second side in response to a tracking error signal; and
   focussing means having a focussing lens for focussing said reflected light beam onto said second surface in response to a focussing error signal.

22. The apparatus as claimed in claim 21, wherein said auxiliary pickup means further comprises:
   a reflecting mirror for reflecting said reflected light beam onto said second side;
   a tilting mirror for providing rotary power;
   a gear assembly connected to said tilting mirror; and
   a ring gear engaging said gear assembly, for rotating said reflecting mirror in response to movement of said gear assembly.

23. The apparatus as claimed in claim 21, wherein said focussing means comprises:
   a coil element with said focussing lens mounted on said coil element, said coil element moving parallel to said axis of rotation of the optical disk in response to said focussing error signal.

24. The apparatus as claimed in claim 22, wherein said focussing means comprises:
   a coil element with said focussing lens mounted on said coil element, said coil element moving parallel to said axis of rotation of the optical disk in response to said focussing error signal.

* * * * *

UNITED STATES PATENT AND TRADEMARK OFFICE
CERTIFICATE OF CORRECTION

PATENT NO. : 5,263,013
DATED : November 16, 1993
INVENTOR(S) : Sin-won Kang

It is certified that error appears in the above-indentified patent and that said Letters Patent is hereby corrected as shown below:

Column 1,

Line 66,     delete "in";

Column 2,

Line 23,     change "a other" to --another--;

Line 28,     change "an" to --on--;

Line 30,     change "an" to --and--;

Column 3,

Line 2,     change "(1B)" to --1A--;

Column 4,

Line 21,     change "an" to --a focussing--;

UNITED STATES PATENT AND TRADEMARK OFFICE
CERTIFICATE OF CORRECTION

PATENT NO. : 5,263,013
DATED : November 16, 1993
INVENTOR(S) : Sin-won Kang

It is certified that error appears in the above-indentified patent and that said Letters Patent is hereby corrected as shown below:

Column 8,

Line 15,    change "mirror" to --motor--; and

Line 16,    change "mirror" to --motor--.

Signed and Sealed this

Fourth Day of October, 1994

*Attest:*

BRUCE LEHMAN

*Attesting Officer*    *Commissioner of Patents and Trademarks*